United States Patent [19]

Miura et al.

[11] Patent Number: 5,110,537
[45] Date of Patent: May 5, 1992

[54] WATER QUALITY INSPECTION METHOD AND APPARATUS THEREFOR

[75] Inventors: Hideo Miura, Ibaraki; Asao Nishimura, Ushiku; Shinji Sakata, Katsuta; Tasuku Shimizu, Hitachi; Shigeo Hattori, Ibaraki, all of Japan

[73] Assignee: Hitachi, Ltd., Tokyo, Japan

[21] Appl. No.: 484,914

[22] Filed: Feb. 26, 1990

[30] Foreign Application Priority Data

Feb. 27, 1989 [JP] Japan ................................. 1-42986

[51] Int. Cl.⁵ ............................................. G21C 9/00
[52] U.S. Cl. .................................. 376/305; 376/245; 376/306
[58] Field of Search ..................... 376/245, 305, 306; 324/425, 438, 439, 443, 446, 448, 673

[56] References Cited

U.S. PATENT DOCUMENTS

| | | | |
|---|---|---|---|
| 3,227,951 | 1/1966 | Dykaar | 324/673 |
| 4,295,092 | 10/1981 | Okamura | 324/671 |
| 4,831,324 | 5/1989 | Asakura et al. | 324/71.2 |
| 4,853,638 | 8/1989 | Endov et al. | 324/444 |
| 4,894,604 | 1/1990 | Dowling et al. | 324/448 |
| 5,057,212 | 10/1991 | Burrows | 210/85 |

Primary Examiner—Brooks H. Hunt
Assistant Examiner—Meena Chelliah
Attorney, Agent, or Firm—Antonelli, Terry, Stout & Kraus

[57] ABSTRACT

A method and apparatus for inspecting the change in a water quality in terms of the change in a corrosion rate by detecting the capacity change between opposed electrodes due to the corrosion of electrode surfaces. As a result, the water quality can be continuously monitored over a long time while leaving the electrodes in the water to be inspected. Thus, the method and apparatus are suited for controlling the water quality especially in an atomic reactor vessel.

23 Claims, 4 Drawing Sheets

WATER QUALITY INSPECTION METHOD AND APPARATUS THEREFOR

BACKGROUND OF THE INVENTION

1. Field of the Invention

The present invention relates to an inspection method of inspecting the quality for water in an atomic reactor vessel and an apparatus therefor.

2. Description of the Prior Art

The method for inspecting the water quality in an atomic reactor is exemplified in the prior art by inserting a test piece of a predetermined shape into a reactor vessel to measure a change in the behavior of the crack growth of the test piece due to a change in the stress corrosion crack phenomenon accompanying the water quality change due to a change in the dissolved oxygen concentration. Here, examples of the defective shape detecting method of the test piece and the apparatus therefor are the technology disclosed in Japanese Patent Laid-Open No. 80104/1985.

In this prior art, the change in the water quality (in which the corrosion rate of the test piece material is increased to raise the corrosion growth rate when the dissolved oxygen concentration in pure water is increased) is detected from the change in the crack growth rate in the test piece so that the usable lifetime of the test piece is monotonously decreased with the crack growth. Especially in case the water quality is seriously changed, the crack growth rate is drastically accelerated. After the counter-measures for preventing the water quality change, the crack length is so elongated that the test piece has to be replaced soon. This raises a problem that it is difficult to accomplish a continuous inspection of one test piece for a long time (longer than at least a periodic inspection interval). In addition, the water quality inspection method using the corrosion potential is exemplified by the technology, as disclosed in Japanese Patent Laid-Open No. 75646/1988.

SUMMARY OF THE INVENTION

The present invention has an object to provide a water quality inspection method which can accomplish the water quality inspection continuously for a long time with a single test piece.

In order to achieve the above-specified object, the quality of water such as the water in an atomic reactor vessel can be continuously inspected by disposing opposed metallic electrodes in the water so that the change in the distance between the metal surfaces may be grasped as the change in the electrostatic capacity between the two electrodes to detect the change in the corrosion rate thereby to detect the change in the water quality.

Specifically, the desirable (or representative) structures of the water quality inspecting method and apparatus of the present invention will be described in the following.

(1) The change in the water quality is detected in terms of the change in the electrostatic capacity between the electrodes due to the corrosion of the opposed electrode surfaces.

(2) The opposed electrodes are one or two or more pairs of parallel flat electrodes. That is to say, the paired electrode structure is composed of a plurality of flat electrodes arranged in parallel.

(3) The opposed electrodes are one or two or more pairs of concentric cylindrical electrodes. That is to say, the paired electrode structure is of the dual-tube structure composed of two cylindrical electrodes.

(4) A plurality of pairs of electrodes of the structures (2) and (3) are used in combination. That is to say, the opposed metal shapes to be disposed in the reactor vessel are specified in parallel flat or coaxial cylindrical shapes, and the number of pairs to be adopted may be one or more.

(5) The water quality change is detected in terms of the difference between the changes in the capacities of the two pairs of electrodes of different materials. That is to say, the plural pairs of electrodes are made of individually or partially different materials (having different corrosion rates under an identical circumstance), as in the combination of corrosion-resistive and corrosive materials.

(6) The inter-electrode capacity change is measured directly as the impedance change between the electrodes or as the balanced state (or bridge balance) of the Maxwell bridge.

(7) In order to change the inlet and outlet ports of water into or out of the opposed electrodes to be disposed in the reactor vessel, either the electrodes themselves or their surrounding protective layers are provided with a rotating or turn mechanism.

(8) The electrostatic capacity changes detected are indicated digitally or graphically on the monitor display of a CRT (i.e., Cathode Ray Tube).

(9) In case the value or changing (for time-changing) rate of the electrostatic capacity change detected exceeds a predetermined constant value, it is decided that the water quality has changed to take countermeasures for preventing the water quality change (by injecting high-pressure hydrogen, for example).

(10) The electrodes for measuring the plural electrostatic capacities disposed in the reactor vessel are electrically connected in parallel.

(11) The metallic electrodes are either partially buried, adhered to or made as a structure to contact with a nonconductive material.

If the opposed metal surfaces are corroded, the distance between the metallic electrodes is changed. In the parallel flat electrode structure, for example, the electrostatic capacity $C_1$ per unit area is expressed in the following form, if the inter-electrode distance is designated at d and if the dielectric constant of pure water is designated at $\epsilon$:

$$C_1 = \frac{\epsilon}{d}. \tag{1}$$

If the electrode surfaces are corroded by $\Delta d$, the inter-electrode distance increased by $2\Delta d$ so that the electrostatic capacity $C_2$ is expressed by:

$$C_2 = \frac{\epsilon}{d + 2\Delta d}, \tag{2}$$

so that the change $\Delta c$ is given in the following form.

$$\Delta C = C_1 - C_2 = \epsilon \left( \frac{1}{d} - \frac{1}{d + 2\Delta d} \right) = \frac{\epsilon 2\Delta d}{d(d + 2\Delta d)} \quad (3)$$

$$= \frac{\epsilon \cdot 2\Delta d}{d^2 \left( 1 + 2\frac{\Delta d}{d} \right)}$$

For $d \gg \Delta d$, $$\Delta C \simeq \frac{2 \cdot \epsilon}{d^2} \Delta d, \quad (4)$$

and the electrostatic capacity change and the corrosion are proportional so that the corrosion rate can be measured from the electrostatic capacity change. Since the corrosion rate is highly dependent upon the water quality in the reactor vessel, i.e., the dissolved oxygen concentration or the pH value so that the water quality can be decided from the corrosion rate.

In case the opposed electrodes are of the coaxial cylindrical structure, moreover, the electrostatic capacity per unit length of the cylinder is given for an internal electrode surface radius of $r_1$ and an opposed external electrode surface radius of $r_2$ and for the dielectric constant $\epsilon$ of the pure water:

$$C_3 = \frac{2\pi\epsilon}{\log \frac{r_2}{r_1}}. \quad (5)$$

Hence, the capacity is changed, as follows, if the electrode surfaces are corroded by $\Delta r$;

$$C_4 = \frac{2\pi\epsilon}{\log \frac{r_2 + \Delta r}{r_1 - \Delta r}}, \quad (6)$$

so that the capacity change accompanying the corrosion is given in the following form:

$$\Delta C = 2\pi\epsilon \left\{ \frac{1}{\log \frac{r_2}{r_1}} - \frac{1}{\log \frac{r_2 + \Delta r}{r_1 - \Delta r}} \right\} \quad (7)$$

$$= 2\pi\epsilon \left\{ \frac{1}{\log \frac{r_2}{r_1}} - \frac{1}{\log \left(\frac{r_2}{r_1}\right)\left(\frac{1 + \frac{\Delta r}{r_2}}{1 - \frac{\Delta r}{r_1}}\right)} \right\}$$

$$\simeq 2\pi\epsilon \left\{ \frac{1}{\log \frac{r_2}{r_1}} - \frac{1}{\log \frac{r_2}{r_1} + \log\left\{ 1 + \left(\frac{1}{r_2} + \frac{1}{r_1}\right)\Delta r \right\}} \right\}$$

$$\simeq 2\pi\epsilon \left\{ \frac{1}{\log \frac{r_2}{r_1}} - \frac{1}{\log \frac{r_2}{r_1} + \left(\frac{1}{r_2} + \frac{1}{r_1}\right)\Delta r} \right\}.$$

For $\log (r_2/r_1) \gg \left( \frac{1}{r_2} + \frac{1}{r_1} \right)\Delta r$, the capacity change is transformed, as follows:

$$\Delta C \simeq \frac{2\pi\epsilon}{\left(\log \frac{r_2}{r_1}\right)^2} \left( \frac{1}{r_2} + \frac{1}{r_1} \Delta r \right). \quad (8)$$

In this case, too, the electrostatic capacity change is proportional to the corrosion so that the water quality inspection can be accomplished like the foregoing case of the parallel flat electrodes.

If the opposed electrodes are provided in plural pairs and are electrically connected in parallel, the total electrostatic capacity is the sum of the capacities of the individual phases so that the absolute values of the electrostatic changes in the case of an equal corrosion can be increased to raise the measurement sensitivity.

If, moreover, the inlet and output ports of the water to and from the space between the electrodes are changed by the rotating or turn mechanism, the corrosion in the electrode surfaces can be made uniform to prevent the local corrosion development (in which the inlet side is more corroded than the outlet side, for example) so that the stable measurements can be accomplished.

The plural pairs of opposed electrodes are made of two or more kinds of materials, and the corrosion rates are different between the materials under an identical circumstance. Then, if the difference in the electrostatic capacity change between the opposed electrodes of different materials is detected, the electrostatic capacity change due to the change other than the corrosion of the electrodes due to the influences of the change in the dielectric constant of the pure water can be canceled to accomplish the measurement highly accurately.

If the electrostatic changes measured are displayed digitally or graphically on the monitor of the CRT of the like, the state of the water quality can be recognized by the operator's eyes. If, moreover, both the value of $\Delta C$ and the timing changing rate of $\Delta C$ are used as the standards for deciding the water quality change, an abnormal state due to a slow water quality change can be detected by the value $\Delta C$, whereas an abnormal due to an abrupt water quality change can be detected by the timing changing rate of $\Delta C$, so that the water quality can be stably controlled within a constant range. Depending upon the magnitude of the time-changing rate of $\Delta C$, still moreover, it is also possible to decide both the emergency of the water quality change preventing countermeasures and the level of injection in case the control material such as a chemical compound is to be injected from the outside.

In the water quality inspecting method thus far described, the measurements can be continuously accomplished for a long time if thickness of the electrodes is made far larger than the corrosion.

According to the present invention, the water quality can be inspected continuously for a long time by using the single test piece (e.g., one or more pairs of opposed electrodes) disposed in an atomic reactor vessel. Thus, the present invention can have an effect to provide a stable water quality inspecting and controlling method.

PREFERRED EMBODIMENTS OF THE INVENTION

Figure 1:
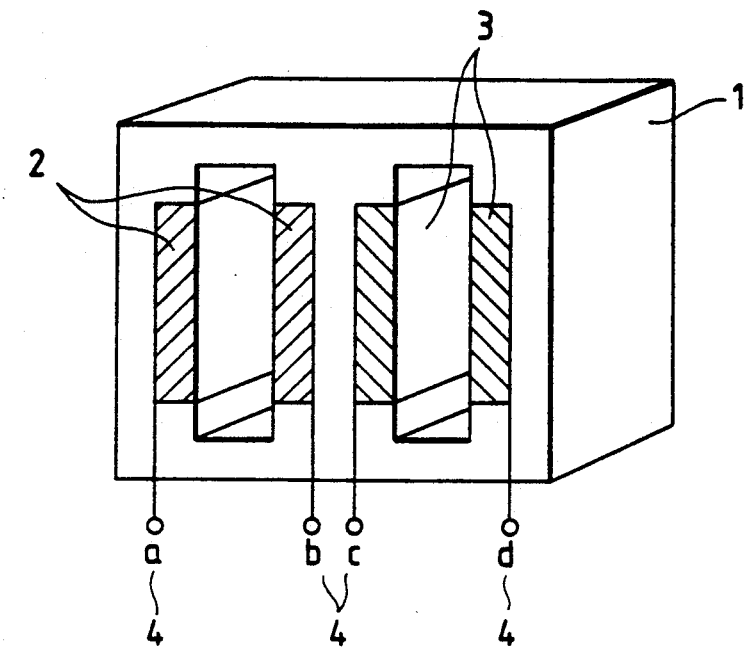
FIG. 1 is a perspective view showing opposed electrodes to be used in one embodiment of the present invention.
Figure 2:
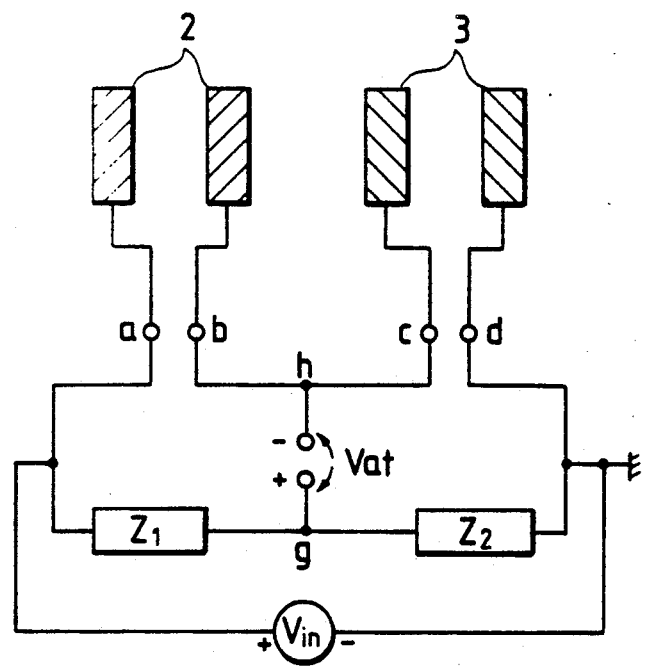
FIG. 2 is a circuit diagram showing a detector for detecting the change in an electrostatic capacity between the opposed electrodes.
Figure 3:
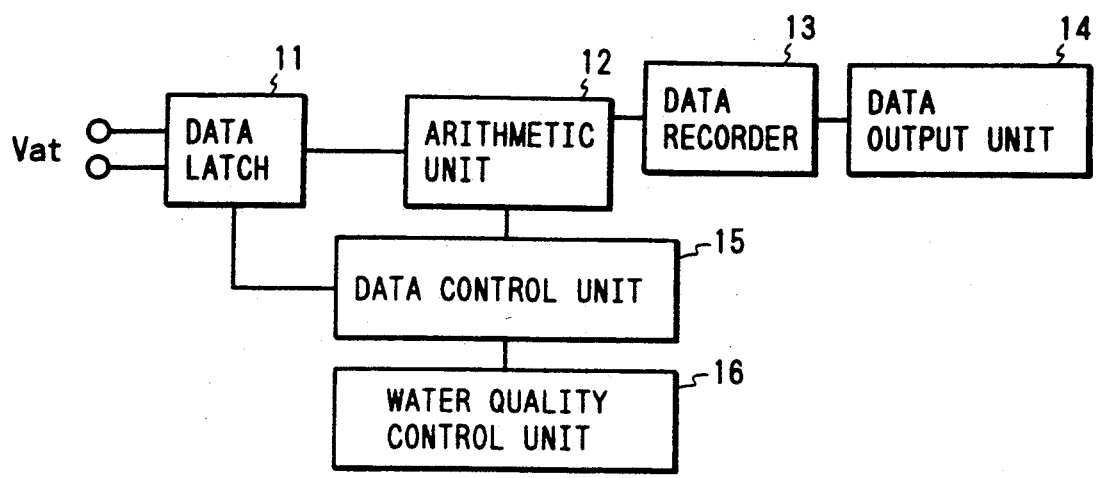
FIG. 3 is a block diagram for processing measured data.
Figure 4:
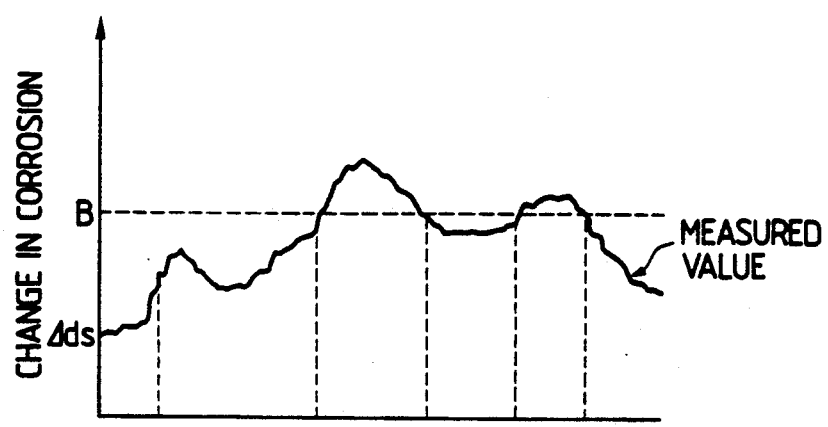
FIG. 4 is a graph showing a characteristic curve of an example of the data output.
Figure 5:
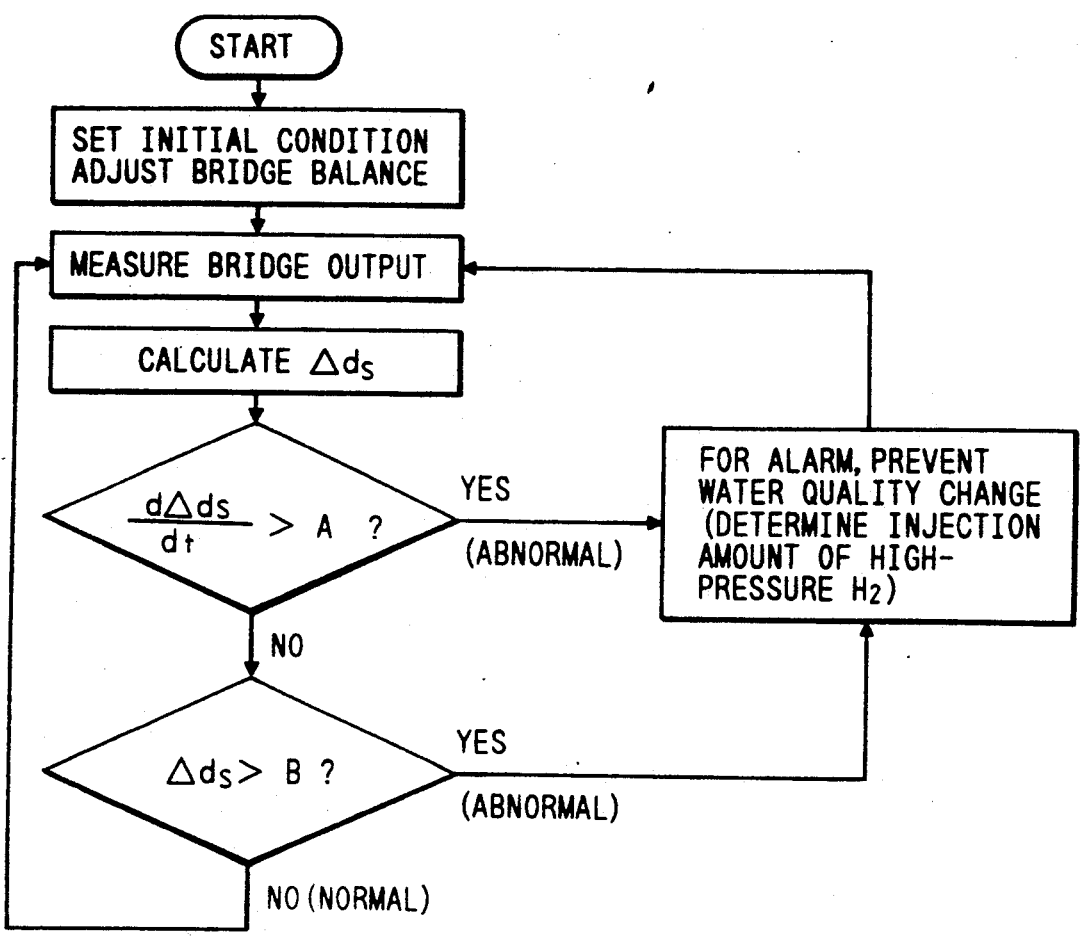
FIG. 5 is a flow chart showing the water quality determination and control.

One embodiment of the present invention will be described in the following with reference to FIGS. 1 to 5. FIG. 1 presents an exterior view showing the opposed electrodes of the water quality inspection method according to the embodiment of the present invention; FIG. 2 shows the method of detecting the electrostatic capacity change of the present invention; FIG. 3 is a block diagram showing the water quality control system; FIG. 4 shows the display method of the electrostatic capacity change detected; and FIG. 5 is a flow chart showing the operating concept of the water quality control system.

The opposed electrodes to be disposed in an atomic reactor vessel are assembled such that they are fixed with a zirconia structure 1 to have their opposed faces contacting with the pure water, as shown in FIG. 1, and such that the two pairs of electrodes (i.e., stainless steel electrodes 2 and platinum electrodes 3) form parallel flat electrodes. The pure water in the reactor vessel flows from this side of FIG. 1 into the gap between the opposed electrodes and out to the opposite side. Reference numeral 4 designates four electrode elements (a, b, c and d). In the present embodiment, the opposed electrode 2 is made of stainless steel, and the opposed electrode 3 is made of a different material such as platinum. From these electrodes, there are led out the electrode terminals 4 (a, b, c and d) for detecting the electrostatic capacities. Incidentally, the materials for the electrodes should not be limited to the above-specified ones but may be other metallic (conductive) materials. Moreover, the zirconia to be used as the electrode fixing structure should not be limited thereto but may be replaced by another non-conductive material.

In the present embodiment, moreover, the electrodes of each material are composed of one pair but may be two or more pairs. However, plural pairs of electrodes of a common material may preferably be connected electrically in parallel. If, in the present embodiment: the initial gap distance between the opposed electrodes is designated at d; the electrode area is designated at S; and the dielectric constant of pure water is designated at $\epsilon$, the capacity Cs between the stainless electrodes 2 and the capacity Cp between the platinum electrodes 3 are:

$$C_s = C_p = \frac{\epsilon_o S}{d}. \tag{9}$$

Incidentally, the initial electrode gap distance and electrode area need not always be equalized between the electrodes of two materials.

FIG. 2 shows an example of the method of detecting the change in the electrostatic capacities of the electrodes disposed. In the present embodiment, a bridge circuit is made to detect the difference in the changes in the electrostatic capacities between the two pairs of electrodes. In FIG. 2, letters $Z_1$ and $Z_2$ designate the known impedances for adjusting the bridge balance, which are assumed to be $Z_1 = Z_2$ in the present embodiment. If the Equation (9) holds in the initial state, the potentials $V_g$ and $V_h$ at points g and h in FIG. 2 are expressed by the following Equations, respectively.

$$V_g = \frac{Z_2}{Z_1 + Z_2} V_{in} = \frac{1}{2} V_{in}; \tag{10}$$

and $$V_h = \frac{\frac{1}{j_w C_p}}{\frac{1}{j_w C_s} + \frac{1}{j_w C_p}} V_{in} = \frac{1}{1 + \frac{C_p}{C_s}} V_{in} = \frac{1}{2} V_{in}. \tag{11}$$

Here, the bridge output $V_{out}$ is:

$$V_{out} = V_g - V_h = 0 \tag{12}.$$

It is assumed that the corrosions of the individual electrodes be started from this state. The stainless steel material and the platinum material have different corrosion rates under an identical circumstance and are assumed to have corrosions $\Delta d_s$ and $\Delta d_p$. Then, the individual inter-electrode capacities are:

$$C_s = \frac{\epsilon S}{d + \Delta d_s} = \frac{\epsilon S}{d\left(1 + \frac{\Delta d_s}{d}\right)} \doteq C_o\left(1 - \frac{\Delta d_s}{d}\right); \tag{13}$$

and $$C_p = \frac{\epsilon S}{d + \Delta d_P} = \frac{\epsilon S}{d\left(1 + \frac{\Delta d_p}{d}\right)} \doteq C_o\left(1 - \frac{\Delta d_p}{d}\right). \tag{14}$$

Here, $\Delta d_s$ and $\Delta d_p << d$, and $C_o = \epsilon S/d$.

In this case, the potential at the point h is changed, as follows, if the Equation (11) is used:

$$V_{h'} = \frac{1}{1 + \frac{C_p}{C_s}} V_{in} = \frac{1}{1 + \frac{1 - \frac{\Delta d_p}{d}}{1 - \frac{\Delta d_s}{d}}} V_{in}. \tag{15}$$

Since it generally holds that $\Delta d_p/d << \Delta d_s/d << 1$, the Equation (15) is transformed, as follows:

$$V_{h'} \doteq \frac{V_{in}}{1 + \frac{1}{1 - \frac{\Delta d_s}{d}}} \doteq \frac{V_{in}}{1 + \left(1 + \frac{\Delta d_s}{d}\right)} = \frac{V_{in}}{2 + \frac{\Delta d_s}{d}} \quad (16)$$

$$\doteq \frac{1}{2}\left(1 - \frac{\Delta d_s}{2d}\right) V_{in}$$

Hence, the bridge output of this case is proportional to the corrosion $\Delta d$ of the stainless steel electrodes 2, as follows:

$$V_{out} = V_g - V_{h'} = \frac{1}{2} V_{in} - \left\{ \frac{1}{2}\left(1 - \frac{\Delta d_s}{2d}\right) V_{in} \right\} \quad (17)$$

$$\doteq \frac{\Delta d_s}{4d} V_{in}$$

Incidentally, the reason why the capacity between the platinum electrodes 3 having a very little corrosion is measured in the present embodiment is as follows. Since the change in the dielectric constant of the pure water due to the temperature change or the like is also detected as the change in the electrostatic capacity, it is intended to cancel the electrostatic capacity change caused by other than the corrosion. In case, moreover, the electrostatic capacity change due to other than the corrosion can be ignored, the platinum electrodes 3 are not indispensable, but a known capacity may be connected between the electrode terminals c and d of FIG. 2 outside of the reactor vessel.

FIGS. 3 to 5 show an example of the system for controlling the water quality by using the electrostatic change detected in the present embodiment. The relations between the water quality and the corrosion rate of the electrode material (i.e., the stainless steel electrode in the present embodiment) are stored as the data base in advance in the data recorder. The state of the water quality is decided by latching the bridge circuit output $V_{out}$ of FIG. 2 in a data latch 11 for a constant period or at a specified time, by determining the corrosion $\Delta d_s$ from the Equation (17) in an arithmetic unit 12, and by comparing the corrosion with the value of the data base. All the data flows are controlled by a data control unit 15, and the decision results are transferred to a water quality control unit 16.

FIG. 4 shows an example of the output of the data output unit 14 (e.g., a CRT monitor) of FIG. 3, namely, an example of the time change of the corrosion. A value B appearing on the ordinate (indicating the corrosion) corresponds to the allowable limit of the water quality change.

FIG. 5 is a flow chart showing an example of the control method in the water quality control unit. First of all, the initial state of the block circuit is adjusted (e.g., $V_{out}=0$), and the values of $\Delta d_s$ and $d\Delta d_s/d_t$ (i.e., the time change of $\Delta d_s$) are received as the output of the data processing system shown in FIG. 3. In order to cope with the abrupt changes, a comparison is made with the allowable limit (e.g., a constant A) of $d\Delta d_s/d_t$. In case the changing rate is higher than A, it is decided that the water quality is abnormal, and the water quality change is prevented (by introducing high-pressure hydrogen, for example, in the present invention). The introduction amount and rate in this case are determined (such that the introduction amount and rate are high for the large values of $\Delta d_s$ and $d\Delta d_s/d_t$ whereas the introduction amount and rate are low for the small values of $\Delta d_s$ and $d\Delta d_s/d_t$ by using the values of $d\Delta d_s/d_t$ and $\Delta d_s$ (and another value, if necessary). This state is indicated at point $\alpha$ in FIG. 4, for example. In case the value of $d\Delta d_s/d_t$ is smaller than the set value A, the value of $\Delta d_s$ and the allowable limit B of the corrosion change are compared.

In case $\Delta d_s < B$, it is decided that the water quality is normal. In case $\Delta d_s > B$, it is decided that the water quality is abnormal (between $\beta - \gamma$ and $\eta - \xi$, for example, as shown in FIG. 4), and the counter-measures for preventing the water quality are executed like before). In the case of the abnormal decision, the alarm (e.g., sounds, colors or lights) is generated to call the attention of the controller.

In the present embodiment, the change in the electrostatic capacity is detected by the bridge method, but the capacity changes between the electrodes may be independently measured by the bridge method or the impedance measuring method to detect their difference. Moreover, the electrode materials should not be limited in the least to the specified ones of the present embodiment, but materials having highly different corrosion resistances may preferably be selected in case a plurality of materials are used. Still moreover, the number of kinds of the materials need not be limited to two but may be three or more.

On the other hand, the counter-measures for preventing the water quality change should not be limited to the injection of high-pressure hydrogen but may be another method including the reactor stopping means.

The data output type should not be limited to that shown in FIG. 4 but may be indicated by numerals, letters or pictures if it can be easily recognized by the controller.

As has been described hereinbefore, according to the present embodiment, there can be attained an effect to provide a stable water quality control system which is enabled to detect the change in the quality of water in an atomic reactor vessel by placing the single test piece (i.e., the opposed electrode structure) in the reactor vessel for a long time.

Figure 6:
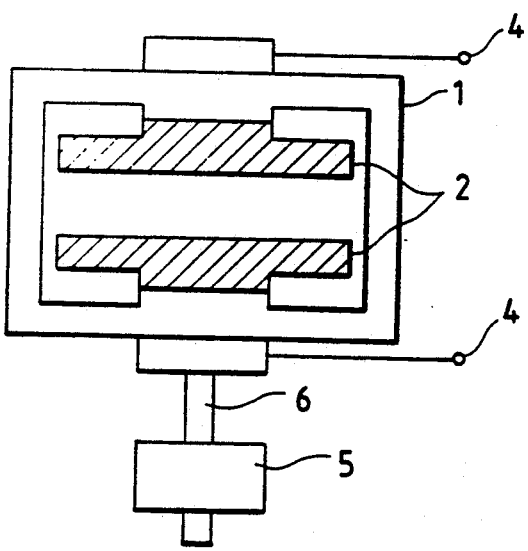
FIG. 6 is a schematic section showing opposed electrodes to be used in a second embodiment of the present invention.

Next, a second embodiment of the present invention will be described in the following with reference to FIG. 6. FIG. 6 is a section showing the opposed electrodes to be disposed in the atomic reactor vessel. The electrodes are disc-shaped stainless steel ones 2 which are fixed in the zirconium structure 1. The inter-electrode capacity is measured between the electrode terminals 4. In the present embodiment, the pure water flows in from this side of the drawing and out to the other side. With a view to establishing an offset in the contents of the electrodes at the inlet and outlet sides, the zirconium structure 1 is enabled to have its flow direction changing interruptedly, at a constant interval or arbitrarily such that its whole portion connected to the spindle 6 of a motor 5 is rotated. Incidentally, the stainless steel electrodes 2 need not have their shapes limited to discs but may be rectangular. The materials of these electrodes need not be limited to stainless steel but may be another conductive. The number of pairs of the opposed electrodes is only one in the present embodiment but may be two or more, as has been described in the first embodiment. Moreover, the electrodes of plural pairs may be laminated in the direction of the common spindle 6 of FIG. 6, disposed in a plane common with the electrodes 2 while sharing the spindle 6, or provided absolutely independently of one another.

As has been described hereinbefore, according to the present embodiment, there can be attained an effect to construct easily the opposed electrodes for inspecting the quality of water in the reactor vessel.

Figure 7:
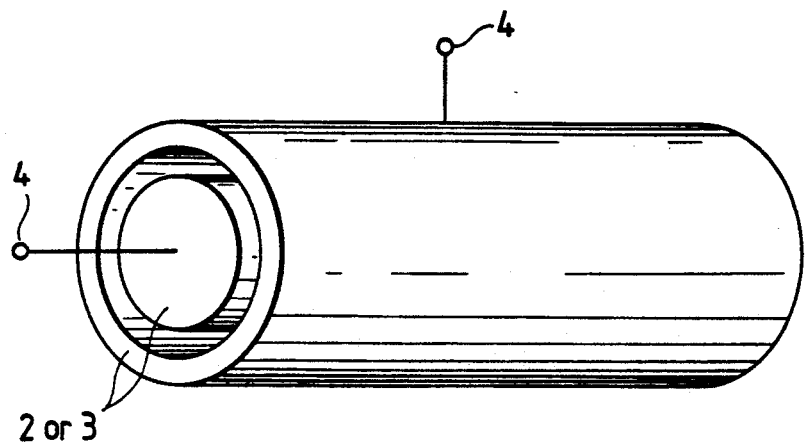
FIG. 7 is a perspective view showing the shape of a single opposed electrode according to a third embodiment of the present invention.
Figure 8:
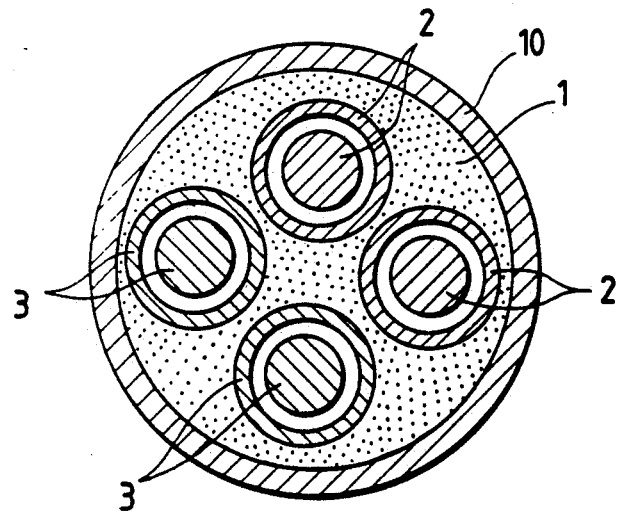
FIG. 8 is a section showing the opposed electrodes of the third embodiment of the present invention.

Next, a third embodiment of the present invention will be described with reference to FIGS. 7 and 8. FIG. 7 shows the shape of the opposed electrode unit to be used in the present embodiment for inspecting the water quality, and FIG. 8 shows the sectional shape of the measuring electrodes constructed by using the electrode units of FIG. 7. In the present embodiment, the concentric cylindrical electrodes are used as the opposed ones so that the electrostatic capacity between the internal column and the circumferential cylinder is measured by the electrode terminals 4. It is assumed that the pure water to be measured flows between the electrodes in the axial direction of the cylinder. FIG. 8 shows the sectional shape of the electrodes which are constructed by using four sets of single electrodes shown in FIG. 7. Two sets of stainless electrodes 2 and two sets of platinum electrodes 3 are used and insulated from one another by the zirconium structure, and the whole structure is coated with a stainless steel coating 10. This stainless steel coating 10 is provided for protecting the overall strength and shielding the structure electrically but is not indispensable. The electrodes of the common materials are electrically connected in parallel so that the capacity changes of the units may be detected as a sum to enlarge the absolute value of the measurement sensitivity. In each set of the electrodes, the pure water flows between the electrodes in a direction normal to the face of the drawing. The method described in connection with the first embodiment can be applied for detecting the electrostatic capacity and controlling the water quality. Moreover, the method of selecting the individual materials and the single electrodes need not always be limited to those of the present embodiment, as has been described in connection with the first embodiment.

As has been described hereinbefore, according to the present embodiment, there can be attained an effect to construct the opposed electrodes for inspecting the quality of water in the reactor vessel.

What is claimed is:

1. A method of inspecting the quality of water by measuring a variation in the water quality in terms of a difference in time variation of a distance between respective pairs of opposed electrodes of two or more pairs of opposed electrodes due to the corrosion rate of the electrode surface, the respective pairs of opposed electrodes being of the same material, and at least one of the pairs of opposed electrodes being of material different from material of another of the pairs of opposed electrodes.

2. A water quality inspecting method according to claim 1, wherein said opposed electrodes are composed of pairs of flat plates arranged in parallel.

3. A water quality inspecting method according to claim 1, wherein said opposed electrodes are composed of pairs of cylindrical electrodes arranged concentrically of each other.

4. A water quality inspecting method according to claim 1, wherein said opposed electrodes are composed of a combination of parallel flat plate electrodes and concentric cylindrical electrodes.

5. A water quality inspecting method according to claim 1, wherein the difference in time variation of a distance is measured in accordance with capacity changes between the electrodes.

6. A water quality inspecting method according to claim 5, wherein the capacity changes are detected in terms of the changes in a bridge balance.

7. A water quality inspecting method according to claim 6, wherein the capacity changes between the electrodes are indicated optically or graphically on the display of a monitor.

8. A water quality inspecting method according to claim 6, wherein the water quality is decided to be abnormal, if the inter-electrode capacity change exceeds a predetermined value, and taking counter-measures for preventing the change in the water quality.

9. A water quality inspecting method according to claim 8, wherein said counter-measures for preventing the water quality change are to inject hydrogen under a high pressure.

10. A water quality inspecting method according to claim 9, wherein the amount of the high-pressure hydrogen to be injected is decided by the time-changing rate of the inter-electrode capacity change.

11. A water quality inspecting method wherein opposed electrodes are composed of two pairs of electrodes respectively made of corrosion-resistive and corrosive materials, and detecting a difference in time variation of a distance between respective pairs of opposed electrodes as one of a difference and ratio in a time variation between the two pairs of opposed electrodes as an indication of a variation in water quality.

12. A water quality inspecting method wherein opposed electrodes are disposed in an atomic reactor vessel so that the change in the distance between the metal surfaces of two pairs of electrodes accompanying the corrosion of the electrode surface is detected as a difference in time variation of the distance between respective pairs of electrodes in accordance with an electrostatic capacity change between the electrodes to detect the change in the corrosion rate, whereby the change in the water quality is continuously measured on the basis of the change in the corrosion rate.

13. A liquid water quality inspecting apparatus comprising two or more pairs of opposed electrodes at least partially electrically connected in parallel and dipped in the liquid water to be inspected for grasping the situations of the changing water quality and made of materials which will have their surfaces corroded by an electrochemical reaction accompanying corrosion rate change, at least one of the pairs of opposed electrodes being made of material different from material of another of the pairs of opposed electrodes, and means for measuring a difference in time variation of a distance between respective pairs of opposed electrodes as an indication of said water quality change.

14. A water quality inspecting apparatus according to claim 13, wherein the paired electrode structure is composed of two flat electrodes arranged in parallel with each other.

15. A water quality inspecting apparatus according to claim 13, wherein the paired electrode structure is of a dual-tube structure in which the opposed electrodes are cylindrical.

16. A water quality inspecting apparatus according to claim 14, further comprising a rotating mechanism for preventing the inlet and outlet ports of the liquid into and out of the space between the opposed electrodes from being fixed.

17. A water quality inspecting apparatus according to claim 14, further comprising a turn mechanism for preventing the inlet and outlet ports of the liquid into and out of the space between the opposed electrodes from being fixed.

18. A water quality inspecting apparatus according to claim 15, further comprising a rotating mechanism for preventing the inlet and outlet ports of the liquid into and out of the space between the opposed electrodes from being fixed.

19. A water quality inspecting apparatus according to claim 15, further comprising a turn mechanism for preventing the inlet and outlet ports of the liquid into and out of the space between the opposed electrodes from being fixed.

20. A water quality inspecting apparatus according to claim 13, wherein the opposed electrodes are buried at least partially in a nonconductive material.

21. A water quality inspecting apparatus according to claim 13, wherein the opposed electrodes are jointed to a nonconductive material.

22. A water quality inspecting method according to claim 11, wherein the difference in time variation in distance is measured as a difference between capacity changes of one pair of opposed electrodes made of corrosion-resistive material and capacity changes of another pair of opposed electrodes made of corrosive material for detecting the corrosion.

23. A water quality inspecting apparatus according to claim 13, wherein the means for measuring the difference in time variation of a distance includes means for measuring a difference between capacity changes between respective pairs of opposed electrodes.

* * * * *